(12) United States Patent
Furutani et al.

(10) Patent No.: US 8,487,714 B2
(45) Date of Patent: Jul. 16, 2013

(54) DUPLEXER MODULE

(75) Inventors: Koji Furutani, Nagaokakyo (JP);
Daisuke Yoshida, Nagaokakyo (JP);
Yuji Takematsu, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 76 days.

(21) Appl. No.: 13/191,661

(22) Filed: Jul. 27, 2011

(65) Prior Publication Data

US 2011/0279177 A1 Nov. 17, 2011

Related U.S. Application Data

(63) Continuation of application No. PCT/JP2010/050902, filed on Jan. 25, 2010.

(30) Foreign Application Priority Data

Jan. 28, 2009 (JP) .................................. 2009-016090

(51) Int. Cl.
*H03H 7/46* (2006.01)
*H01P 5/12* (2006.01)

(52) U.S. Cl.
USPC ............................ 333/132; 333/126; 333/129

(58) Field of Classification Search
USPC .................. 333/126–129, 132, 134
See application file for complete search history.

(56) References Cited

U.S. PATENT DOCUMENTS

| 7,747,227 | B2 * | 6/2010 | Fukuda ........................... 455/91 |
| 7,855,983 | B2 * | 12/2010 | Knecht et al. .................. 370/280 |
| 2003/0171098 | A1 | 9/2003 | Tai et al. |

FOREIGN PATENT DOCUMENTS

| CN | 201583609 | * | 9/2010 |
| JP | 2005-347889 | A | 12/2005 |
| JP | 2007-124202 | A | 5/2007 |
| JP | 2007-151123 | A | 6/2007 |
| WO | 02/17504 | A1 | 2/2002 |

OTHER PUBLICATIONS

Official Communication issued in International Patent Application No. PCT/JP2010/050902, mailed on Mar. 9, 2010.
English translation of Official Communication issued in corresponding Japanese Patent Application No. 2010-548496, mailed on Jul. 31, 2012.
Official Communication issued in corresponding Japanese Patent Application No. 2010-548496, mailed on Jul. 31, 2012.

* cited by examiner

*Primary Examiner* — Robert Pascal
*Assistant Examiner* — Kimberly Glenn
(74) *Attorney, Agent, or Firm* — Keating & Bennett, LLP

(57) ABSTRACT

A duplexer module prevents a transmission signal and a reception signal in the same band from interfering with each other. The duplexer module includes a transmission line, a reception line, and an antenna common line. In addition, the duplexer module includes a plurality of mounting electrodes arranged along the four sides of an outer edge of a mounting surface of a multilayer substrate. The fourth mounting electrode defining a monitoring port is disposed on a side different from a side on which each of the first mounting electrode defining a transmission port, the second mounting electrode defining a reception port, and the third mounting electrode defining an antenna port is disposed. The fourth mounting electrode defining the monitoring port is a mounting electrode used to output a signal of the monitoring line through which a portion of electrical power is transmitted from the transmission line.

6 Claims, 3 Drawing Sheets

DUPLEXER MODULE

BACKGROUND OF THE INVENTION

1. Field of the Invention

The present invention relates to a duplexer module in which a duplexer used for isolating a reception signal and a transmission signal from each other is provided on a multi-layer substrate or a printed substrate.

2. Description of the Related Art

Duplexers are adopted for front-end portions of cellular phones and the like. In some cases, a multiband-type front-end portion compatible with a plurality of communication systems whose frequency bands are different from one another is configured using a plurality of duplexers (for example, refer to Japanese Unexamined Patent Application Publication No. 2007-124202).

The above-mentioned front-end portion includes a duplexer, a power amplifier, and a directional coupler, which are compatible with each of an 800 MHz band and a 1.9 GHz band. The duplexer isolates a transmission signal and a reception signal, which correspond to a band, from each other. The power amplifier amplifies the transmission signal using electric power supplied from a power-supply line. The directional coupler transmits a portion of the electrical power of the transmission signal to a monitoring line so as to monitor the transmission signal. In such a front-end portion, when interference occurs between signals in individual bands, there is a risk that communication quality is lowered. Therefore, the shapes of internal ground electrodes are set so as to prevent interference between individual bands from occurring.

While it is possible to reduce the interference of signals between individual bands on the basis of the configuration of the above-mentioned front-end portion, it is difficult to fully prevent the interference of signals between the transmission signal and the reception signal in a same band from occurring. In particular, with the development of the downsizing of duplexer modules in recent years, when a power amplifier and a directional coupler are included, problems have occurred in that the transmission signal and the reception signal interfere with each other due to signal leakage from the monitoring line or the power-supply line and receiving sensitivity is deteriorated, or the like.

Usually, while signal leakage occurring between lines in the duplexer has been considered in line design for signal lines through which a transmission signal, a reception signal, and an antenna common signal are transmitted, the signal leakage has not been fully considered in the layout design of mounting electrodes, owing to requests from assembly manufacturers intending to facilitate wiring lines for duplexer modules.

SUMMARY OF THE INVENTION

Therefore, preferred embodiments of the present invention provide a duplexer module capable of preventing the transmission signal and the reception signal in the same band from interfering with each other.

According to a preferred embodiment of the present invention, a duplexer module includes a transmission line, a reception line, and an antenna common line. In addition, the duplexer module includes a plurality of mounting electrodes arranged along four sides of an outer edge of a mounting surface that is one main surface of a rectangular-shaped or substantially rectangular-shaped substrate, and a fourth mounting electrode is disposed on a side different from a side on which each of first to third mounting electrodes is disposed. The first mounting electrode preferably is a mounting electrode used to input a signal of the transmission line. The second mounting electrode is a mounting electrode used to output a signal of the reception line. The third mounting electrode is a mounting electrode used to input/output a signal of the antenna common line. The fourth mounting electrode is a mounting electrode used to output a signal of a monitoring line through which a portion of electrical power is transmitted from the transmission line.

According to this configuration, a signal is prevented from leaking from the monitoring line and going around to enter the reception line or the antenna common line, or a signal is prevented from leaking from another line and going around to enter the monitoring line.

It is preferable that the first mounting electrode is disposed on the first side of the four sides of the outer edge, the second mounting electrode is disposed on the second side thereof, the third mounting electrode is disposed on the third side thereof, which faces the first side, and the fourth mounting electrode is disposed on the fourth side thereof, which faces the second side. On the basis of this configuration, a signal is prevented from leaking from each mounting electrode and going around to enter another line.

It is preferable that a power amplifier inserted into the transmission line is included, a fifth mounting electrode, which is a mounting electrode used to input electrical power to a power-supply line used to supply electric power to the power amplifier, is disposed between the first mounting electrode and the second or the fourth mounting electrode along the outer edge, and a sixth mounting electrode that is a mounting electrode used for grounding is disposed between the fifth mounting electrode and the second or the fourth mounting electrode. According to this configuration, a signal is prevented from leaking from the power-supply line and a signal is prevented from going around to enter the monitoring line, the reception line, or the antenna common line.

It is preferable that the sixth mounting electrode is conductively connected to a surface electrode on which no chip-type element is mounted, through a via hole filled with a conductive material provided in the substrate. According to this configuration, a signal is effectively prevented from leaking from the power-supply line.

It is preferable that the mounting electrode used for grounding is provided on an inner side in relation to a region on the mounting surface, in which the plural mounting electrodes are formed. According to this configuration, a signal is effectively prevented from leaking on the mounting surface.

According to a preferred embodiment of the present invention, the mounting electrode of the monitoring line is disposed on a side different from a side on which each of the mounting electrodes of the transmission line, the reception line, and the antenna common line is disposed. Therefore, the transmission signal is prevented from leaking from the monitoring line and going around to enter the antenna common line or the reception line, or a signal is prevented from leaking from another line and going around to enter the monitoring line. Accordingly, it is possible to prevent the transmission signal and the reception signal in the same band for interfering with each other, and in addition, it is possible to correctly perform monitoring using an output from the monitoring line.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
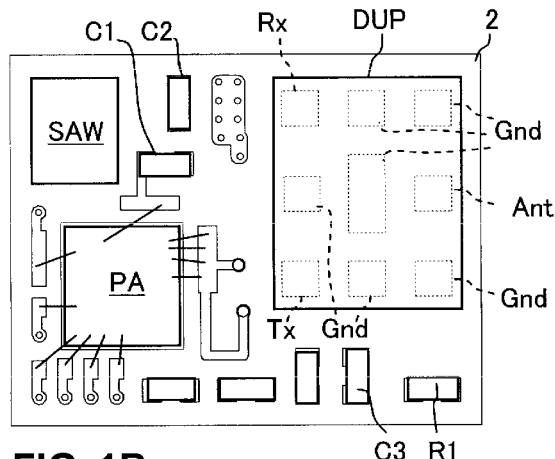
FIGS. 1A-1C are diagrams illustrating an example of a configuration of a duplexer module according to a preferred embodiment of the present invention.
Figure 1B:
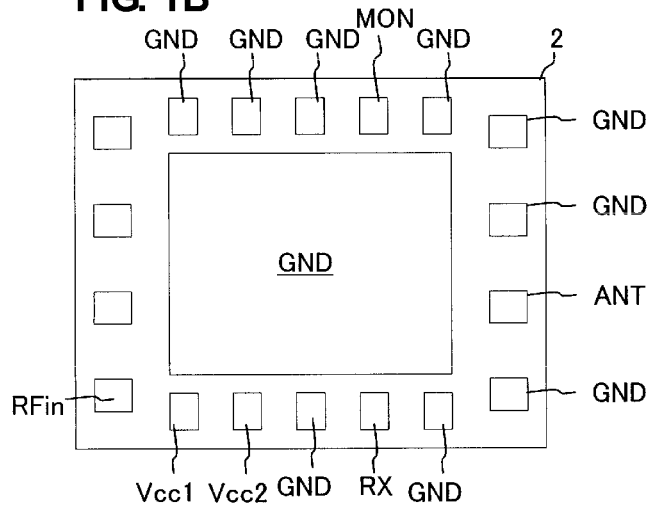
Figure 1C:
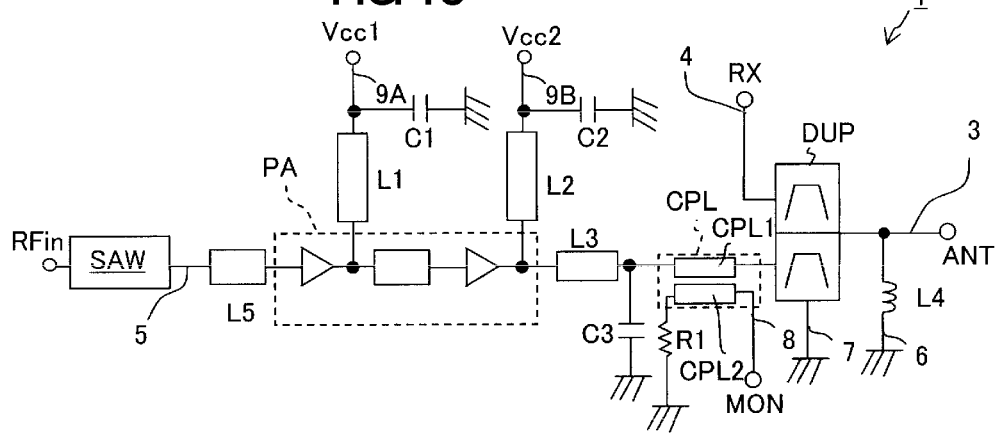

FIGS. 1A-1C are diagrams illustrating an example of the configuration of a duplexer module according to a preferred embodiment of the present invention. FIG. 1A is a top end surface view when the top view of the duplexer module is illustrated, FIG. 1B is a bottom view when the bottom view of the duplexer module is illustrated, and FIG. 1C is a schematic equivalent circuit diagram of the duplexer module.

A duplexer module 1 includes a multilayer substrate 2 in which a plurality of substrates are laminated. A top end surface that is the other main surface of the multilayer substrate 2 is a chip mounting surface, and includes a plurality of surface electrodes on which discrete components are mounted. A bottom surface that is one main surface of the multilayer substrate 2 is a module mounting surface, and includes a plurality of mounting electrodes that are to be the external connection ports of the duplexer module 1. The surface electrodes and the mounting electrodes are connected to one another using pattern electrodes or via holes provided within the multilayer substrate 2.

The equivalent circuit of the duplexer module 1 includes an antenna common line 3, a reception line 4, a transmission line 5, a matching line 6, a ground line 7, a monitoring line 8, and power-supply lines 9A and 9B. In addition, the equivalent circuit of the duplexer module 1 includes a duplexer DUP, a coupler CPL, a power amplifier PA, a surface elastic wave filter SAW, inductors L1 to L5, a resistor R1, and capacitors C1 to C3, as circuit elements. In addition, the equivalent circuit of the duplexer module 1 includes an antenna port ANT, a reception port RX, a transmission port RFin, a monitoring port MON, power supply ports Vcc1 and Vcc2, and ground ports GND, as external connection ports.

The duplexer DUP is a discrete component of the duplexer utilizing a surface elastic wave resonator in which an IDT electrode is provided, and includes a transmission filter and reception filter. The duplexer DUP includes, on the bottom surface thereof, an antenna common terminal Ant, a reception signal terminal Rx, a transmission signal terminal Tx, and ground terminals Gnd, illustrated with dashed lines in FIG. 1A, and these terminal are connected to the surface electrodes of the multilayer substrate 2 using solder or the like.

The antenna common line 3 is a line that connects a surface electrode, on which the antenna common terminal Ant of the duplexer DUP is mounted, and a mounting electrode to be the antenna port ANT, to each other.

The matching line 6 is a line that branches from the antenna common line 3 and is connected to a mounting electrode to be the ground port GND. The inductor L4 is inserted into the matching line 6. The inductor L4 is a circuit element defined by an electrode pattern provided in an interlayer of the multilayer substrate 2 and a via hole formed in a layer.

The reception line 4 is a line that connects a surface electrode, on which the reception signal terminal Rx of the duplexer DUP is mounted, and a mounting electrode to be the reception port RX, to each other.

The ground line 7 is a line that connects a surface electrode, on which the ground terminal Gnd of the duplexer DUP is mounted, and a mounting electrode to be the ground port GND to each other.

The transmission line 5 is a line that connects a surface electrode, on which the transmission signal terminal Tx of the duplexer DUP is mounted, and a mounting electrode to be the transmission port RFin, to each other. The surface elastic wave filter SAW, the inductor L5, the power amplifier PA, the inductor L3, and the coupling line CPL1 of the coupler CPL are inserted into the transmission line 5. In addition, a connection point between the coupling line CPL1 and the inductor L3 is grounded using the capacitor C3 disposed in parallel.

The surface elastic wave filter SAW removes an out-of-band noise from a transmission signal input from the transmission port RFin. The inductor L5 coordinates matching between the surface elastic wave filter SAW and the power amplifier PA. The power amplifier PA amplifies the transmission signal. The inductor L3 and the capacitor C3 coordinate matching between the power amplifier PA and the coupler CPL. The coupler CPL includes the coupling line CPL1 inserted into the transmission line 5 and the coupling line CPL2 inserted into the monitoring line 8, and extracts a portion of the electrical power of the transmission signal passing through the transmission line 5, from the monitoring line 8.

The monitoring line 8 is a line that connects a mounting electrode to be the ground port GND and a mounting electrode to be the monitoring port MON to each other, and the coupling line CPL2 of the coupler CPL is inserted into the monitoring line 8.

The power-supply line 9A is a line that branches from the transmission line 5 and is connected to a mounting electrode to be the power supply port Vcc1. The inductor L1 is inserted into the power-supply line 9A, and the power-supply line 9A is grounded using the capacitor C1 disposed in parallel. The inductor L1 and the capacitor C1 coordinate matching between the power supply port Vcc1 and the power amplifier PA. The power-supply line 9A supplies electric power to the power amplifier PA.

The power-supply line 9B is a line that branches from the transmission line 5 and is connected to a mounting electrode to be the power supply port Vcc2. The inductor L2 is inserted into the power-supply line 9B, and the power-supply line 9B is grounded using the capacitor C2 disposed in parallel. The inductor L2 and the capacitor C2 coordinate matching between the power supply port Vcc2 and the power amplifier PA. The power-supply line 9B supplies electric power to the power amplifier PA.

On the rectangular-shaped mounting surface illustrated in FIG. 1B, a plurality of mounting electrodes are arranged along four sides of the outer edge of the multilayer substrate 2. In addition, a mounting electrode to be the ground port GND is provided on the inner side of these plural mounting electrodes. On a left side in the figure, which corresponds to the first side of a preferred embodiment of the present invention, the first mounting electrode of a preferred embodiment of the present invention, which is to be the transmission port RFin, is disposed. On a lower side in the figure, which corresponds to the second side of a preferred embodiment of the present invention, mounting electrodes to be the ground ports GND, the second mounting electrode of a preferred embodiment of the present invention, which is to be the reception port RX, and the fifth mounting electrode of a preferred embodiment of the present invention, which is to be the power supply ports Vcc1 and Vcc2, are disposed. On a right side in the figure, which corresponds to the third side of a preferred embodiment of the present invention, mounting electrodes to be the ground ports GND and the third mounting electrode of a preferred embodiment of the present invention, which is to be the antenna port ANT, are disposed. On an upper side in the figure, which corresponds to the fourth side of a preferred embodiment of the present invention, mounting electrodes to be the ground ports GND and the fourth mounting electrode of a preferred embodiment of the present invention, which is to be the monitoring port MON, are disposed. Since the first to fourth mounting electrodes are individually disposed on sides different from one another in this way, in the duplexer module 1, it is possible to prevent a signal from leaking from each mounting electrode and going around to enter another line. In particular, since the fourth mounting electrode to be the monitoring port MON is disposed on a side different from sides on which the first to third mounting electrodes are disposed, it is possible to effectively prevent a signal from going around due to signal leakage from the monitoring line.

In addition, mounting electrodes to be the ground ports GND are disposed on both sides of the second mounting electrode to be the reception port RX. Mounting electrodes to be the ground ports GND are also disposed on both sides of the third mounting electrode to the antenna port ANT. Mounting electrodes to be the ground ports GND are also disposed on both sides of the fourth mounting electrode to be the monitoring port MON. Accordingly, it is possible to effectively prevent signal leakage from the second to fourth mounting electrodes. In particular, since a mounting electrode corresponding to the sixth mounting electrode of a preferred embodiment of the present invention is disposed between the mounting electrodes to be the power supply ports Vcc1 and Vcc2 and the mounting electrode to be the reception port RX so as to be the ground port GND, it is possible to effectively prevent signal leakage from the power-supply lines 9A and 9B.

Figure 2A:
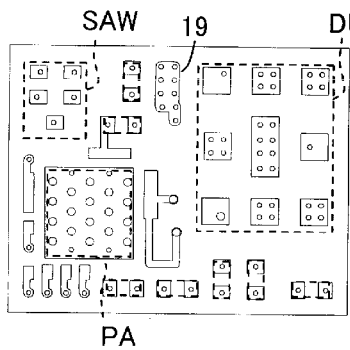
FIGS. 2A-2K are layer diagrams of the duplexer module illustrated in FIGS. 1A-1C.
Figure 2E:
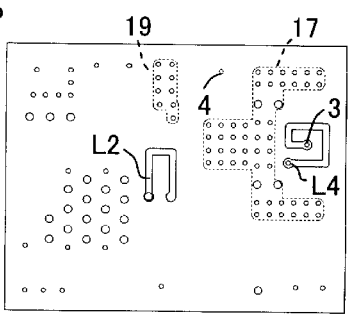
Figure 2I:
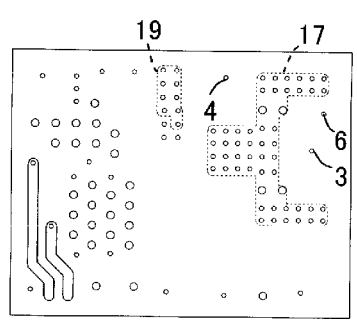
Figure 2B:
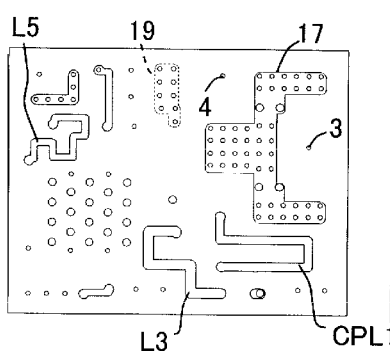
Figure 2F:
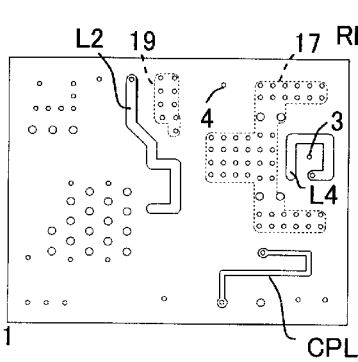
Figure 2J:
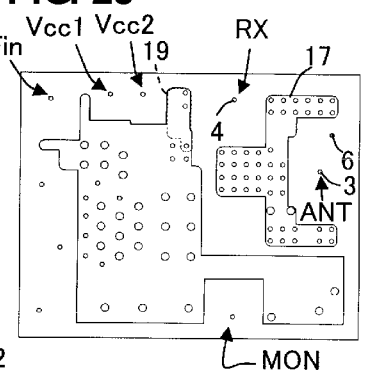
Figure 2C:
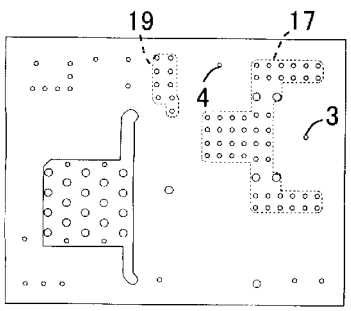
Figure 2G:
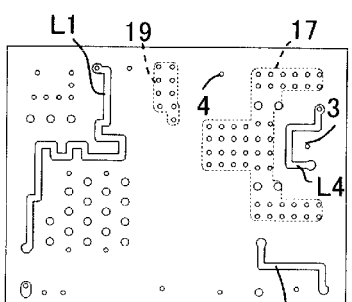
Figure 2K:
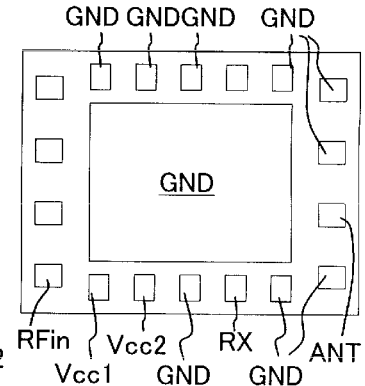
Figure 2D:
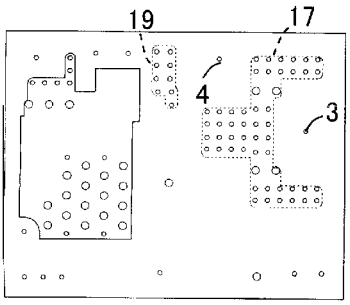
Figure 2H:
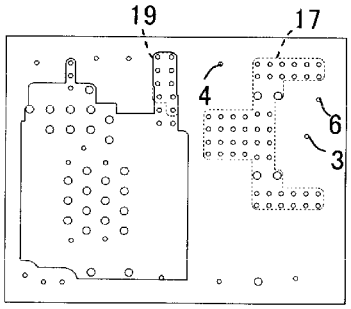

FIGS. 2A-2K are layer diagrams of the multilayer substrate 2. FIGS. 2A to 2J are plan views when the top views of substrates A to J are illustrated from an uppermost layer to a lowermost layer in this order. In addition, FIG. 2K is a plan view when the top view of the back side of the lowermost layer in the multilayer substrate 2 is illustrated. In addition, via holes in the substrates A to J are indicated with circles in the figure.

The substrate A is laminated in the uppermost layer in the multilayer substrate 2, and on the surface thereof, surface electrodes used for mounting discrete components thereon are included. Dashed lines in the figure indicate the outlines of discrete components to be mounted on the surface electrodes. A pattern electrode to be a surface layer ground on which no discrete component is mounted is provided on the upper surface of a ground region 19, and via holes to be subjected to a ground potential are closely disposed in the substrate of the ground region 19.

The substrate B is laminated in a layer second from the chip mounting surface of the multilayer substrate 2. In the substrate B, a pattern electrode to be the inductor L3, a pattern electrode to be the coupling line CPL1 of the coupler CPL, and a pattern electrode to be the inductor L5 are provided. The via hole of the antenna common line 3 is located at a position surrounded by a ground region 17 and a substrate end edge. The via hole of the reception line 4 is located at a position surrounded by the ground region 17, a substrate end edge, and the ground region 19. A pattern electrode to be an inner-layer ground is provided on the upper surface of the ground region 17, and via holes to be subjected to the ground potential are closely disposed in the substrates of the ground region 19 and the ground region 17.

The substrate C is laminated in a layer third from the chip mounting surface of the multilayer substrate 2. The via hole of the antenna common line 3 is located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate D is laminated in a layer fourth from the chip mounting surface of the multilayer substrate 2. The via hole of the antenna common line 3 is located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate E is laminated in a layer fifth from the chip mounting surface of the multilayer substrate 2. In the substrate E, a pattern electrode to be the inductor L4 and a pattern electrode to be the inductor L2 are provided. The via hole of the antenna common line 3 and the pattern electrode and the via hole of the inductor L4 are located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate F is laminated in a layer sixth from the chip mounting surface of the multilayer substrate 2. In the substrate F, a pattern electrode to be the inductor L4, a pattern electrode to be the inductor L2, and a pattern electrode to be the coupling line CPL2 of the coupler CPL are provided. The via hole of the antenna common line 3 and the pattern electrode and the via hole of the inductor L4 are located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate G is laminated in a layer seventh from the chip mounting surface of the multilayer substrate 2. In the substrate G, a pattern electrode to be the inductor L4, a pattern electrode to be the inductor L1, and a pattern electrode to be the coupling line CPL2 of the coupler CPL are provided. The via hole of the antenna common line 3 and the pattern electrode and the via hole of the inductor L4 are located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate H is laminated in a layer eighth from the chip mounting surface of the multilayer substrate 2. The via hole of the antenna common line 3 and the via hole of the matching line 6 are located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrate of the ground region 17. A pattern electrode to be an inner-layer ground is provided on the upper surface of the ground region 19, and via holes to be subjected to the ground potential are closely disposed in the substrate of the ground region 19.

The substrate I is laminated in a layer ninth from the chip mounting surface of the multilayer substrate 2. The via hole of the antenna common line 3 and the via hole of the matching line 6 are located at a position surrounded by the ground region 17 and a substrate end edge. The via hole of the reception line 4 is located at a position surrounded by the ground region 17, a substrate end edge, and the ground region 19. Via holes to be subjected to the ground potential are closely disposed in the substrates of the ground region 19 and the ground region 17.

The substrate J is laminated in a layer tenth from the chip mounting surface of the multilayer substrate 2. Such a plurality of mounting electrodes as illustrated in FIG. 2K are located on the rear surface of the substrate J. Arrows illustrated in the figure indicate the names of ports connected to individual mounting electrodes. The via hole of the antenna common line 3 and the via hole of the matching line 6 are located at a position surrounded by the ground region 17 and a substrate end edge. The via hole of the reception line 4 is located at a position surrounded by the ground region 17, a substrate end edge, and the ground region 19. A pattern electrode to be an inner-layer ground is provided on the upper surface of the ground region 17, and via holes to be subjected to the ground potential are closely disposed in the substrate of the ground region 17. A pattern electrode to be an inner-layer ground is provided on the upper surface of the ground region 19, and via holes to be subjected to the ground potential are closely disposed in the substrate of the ground region 19.

Via holes provided in the ground regions 19 of the substrates A to J are conductively connected to inner-layer grounds provided in the substrates A, H, and J. In addition, the via holes provided in the ground regions 19 of the substrates A to J are conductively connected to a mounting electrode disposed between a mounting electrode to be the power supply port Vcc2 and a mounting electrode to be the reception port RX, from among mounting electrodes illustrated in FIG. 2K. The mounting electrode is a mounting electrode to be the ground port GND, and is connected to the ground potential. Accordingly, via holes and pattern electrodes provided in the ground regions 19 of the substrates A to J are stable at the ground potential, and an electrical wall based on the ground potential is disposed within the substrate. Therefore, it is possible to effectively prevent a signal from leaking between the power supply port Vcc2 and the reception port RX.

In addition, via holes provided in the ground regions 17 of the substrates A to J are conductively connected to inner-layer grounds provided in the substrates B and J. In addition, the via holes provided in the ground regions 17 of the substrates A to J are conductively connected to mounting electrodes located on both sides of a mounting electrode to be the antenna port ANT and a mounting electrode disposed, in the figure, on the right side of a mounting electrode to be the reception port RX, from among mounting electrodes illustrated in FIG. 2K. These mounting electrodes are mounting electrodes to be the ground ports GND, and are connected to the ground potential. Accordingly, via holes and pattern electrodes provided in the ground regions 17 of the substrates A to J are stable at the ground potential, and an electrical wall based on the ground potential is formed within the substrate. Therefore, it is possible to effectively prevent a signal from leaking to the antenna port ANT or from leaking from the antenna port ANT.

In addition, it is also possible to effectively prevent a signal from leaking from the reception port RX or from leaking to the reception port RX, the reception port RX being surrounded by the via holes and the pattern electrodes provided in the ground regions 17 and 19 of the substrates A to J.

Figure 3:
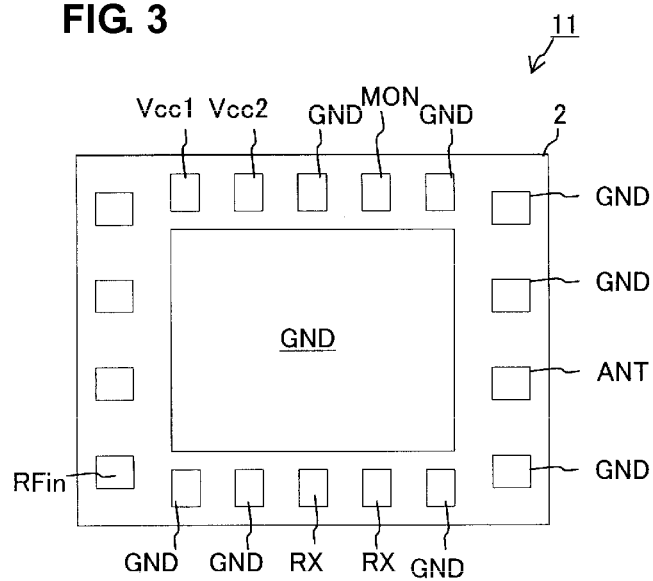
FIG. 3 is a mounting surface diagram of a duplexer module according to another preferred embodiment of the present invention.

FIG. 3 is a mounting surface diagram illustrating an example of the configuration of a duplexer module according to another preferred embodiment of the present invention.

While this duplexer module 11 preferably has the same configuration as that of the duplexer module 1 of the above-mentioned preferred embodiment, the duplexer module 11 differs from the duplexer module 1 in that the reception port RX is a port of a balanced type and the layouts of mounting electrodes to be the power supply ports Vcc1 and Vcc2 are changed from the lower side in the figure to the upper side in the figure.

Even in such a configuration, the first to fourth mounting electrodes are individually disposed on different sides, and hence, in the duplexer module 11, it is possible to prevent a signal from leaking from each of the mounting electrodes and going around to enter the monitoring line, the reception line, or the antenna common line.

In this regard, however, in such a configuration, a signal leakage may be likely to occur between a mounting electrode to be the monitoring port MON and a mounting electrode to be the power supply port Vcc2. Therefore, it is preferable that a mounting electrode disposed between a mounting electrode to be the monitoring port MON and a mounting electrode to be the power supply port Vcc2 is caused to be the ground port GND connected to the ground potential. Furthermore, it is preferable that the mounting electrode has a configuration in which the mounting electrode is conductively connected to the surface electrode corresponding to the sixth mounting electrode of a preferred embodiment of the present invention, directly through a via hole, in the same way as the ground region 19 in the above-mentioned duplexer module 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A duplexer module comprising:
a transmission line;
a reception line;
an antenna common line;
a plurality of mounting electrodes configured to be arranged along four sides of an outer edge of a mounting surface that is one main surface of a substrate; wherein
the plurality of mounting electrodes include:
a first mounting electrode arranged to input a first signal of the transmission line;
a second mounting electrode arranged to output a second signal of the reception line;
a third mounting electrode arranged to input/output a third signal of the antenna common line; and
a fourth mounting electrode arranged to output a fourth signal of a monitoring line through which a portion of electrical power is transmitted from the transmission line; wherein
the fourth mounting electrode is disposed on a side different from a side on which each of the first to third mounting electrodes is disposed, from among the four sides of the outer edge.
2. The duplexer module according to claim 1, wherein
the first mounting electrode is disposed on a first side of the four sides of the outer edge;
the second mounting electrode is disposed on a second side of the four sides of the outer edge;
the third mounting electrode is disposed on a third side of the four sides of the outer edge, the third side facing the first side; and the fourth mounting electrode is disposed on a fourth side of the four sides of the outer edge, the fourth side facing the second side.

3. The duplexer module according to claim 2, further comprising:
a power amplifier configured to be inserted into the transmission line; wherein
the plurality of mounting electrodes includes a fifth mounting electrode arranged to input electrical power to a power-supply line arranged to supply electric power to the power amplifier and a sixth mounting electrode used for grounding;
the fifth mounting electrode is disposed between the first mounting electrode and the second mounting electrode or between the first mounting electrode and the fourth mounting electrode, along the outer edge; and
the sixth mounting electrode is disposed between the fifth mounting electrode and the second mounting electrode or between the fifth mounting electrode and the fourth mounting electrode, along the outer edge.

4. The duplexer module according to claim 3, wherein a plurality of surface electrodes are provided on another main surface of the substrate facing the mounting surface of the substrate, and the sixth mounting electrode is conductively connected to one of the plurality of surface electrodes on which no chip element is mounted, through a via hole provided in the substrate.

5. The duplexer module according to claim 1, wherein a grounding electrode used for grounding is provided on an inner side in relation to a region on the mounting surface on which the plurality of mounting electrodes are provided.

6. The duplexer module according to claim 1, wherein the substrate is rectangular-shaped or substantially rectangular-shaped.

* * * * *